United States Patent
Ginosatis

(10) Patent No.: US 11,485,117 B2
(45) Date of Patent: Nov. 1, 2022

(54) LINER FILM

(71) Applicant: Flexopack S.A., Koropi (GR)

(72) Inventor: Dimitris Ginosatis, Koropi (GR)

(73) Assignee: Flexopack S.A., Koropi (GR)

( * ) Notice: Subject to any disclaimer, the term of this patent is extended or adjusted under 35 U.S.C. 154(b) by 0 days.

(21) Appl. No.: 17/172,280

(22) Filed: Feb. 10, 2021

(65) Prior Publication Data

US 2021/0268779 A1 Sep. 2, 2021

(30) Foreign Application Priority Data

Feb. 11, 2020 (EP) .................................... 20156640

(51) Int. Cl.
*B32B 27/08* (2006.01)
*B32B 27/30* (2006.01)
*B32B 27/32* (2006.01)

(52) U.S. Cl.
CPC ............ *B32B 27/08* (2013.01); *B32B 27/306* (2013.01); *B32B 27/32* (2013.01); *B32B 2307/546* (2013.01); *B32B 2307/72* (2013.01); *B32B 2439/70* (2013.01)

(58) Field of Classification Search
CPC ....... B32B 27/08; B32B 27/306; B32B 27/32; B32B 2439/70; B32B 2307/72; B32B 2307/546
See application file for complete search history.

(56) References Cited

U.S. PATENT DOCUMENTS

| | | | |
|---|---|---|---|
| 6,374,579 B1 | 4/2002 | Muller | |
| 6,534,137 B1 * | 3/2003 | Vadhar | B32B 27/32 428/34.9 |
| 9,016,555 B2 * | 4/2015 | Plunkett | B65D 77/065 229/117.3 |
| 2007/0201774 A1 * | 8/2007 | Plunkett | B65D 77/061 383/109 |
| 2007/0237433 A1 | 10/2007 | Plunkett et al. | |
| 2011/0220534 A1 | 9/2011 | Fussnegger et al. | |
| 2012/0052225 A1 * | 3/2012 | Kani | C08L 29/04 428/35.4 |
| 2017/0021970 A1 * | 1/2017 | Witthuhn | B29C 48/0021 |

FOREIGN PATENT DOCUMENTS

| | | |
|---|---|---|
| EP | 0151462 A2 | 8/1985 |
| EP | 3216599 A1 | 9/2017 |
| EP | 3702153 A1 | 2/2020 |
| WO | 2007121590 A1 | 11/2007 |
| WO | 2010009245 A2 | 1/2010 |

\* cited by examiner

*Primary Examiner* — Michael C Miggins
(74) *Attorney, Agent, or Firm* — Maxwell J. Petersen; FisherBroyles, LLP

(57) ABSTRACT

The invention relates to multilayer film and the use of said film as a part of a FIBC construction.

21 Claims, No Drawings

LINER FILM

The invention relates to multilayer film and the use of said film as a part of a FIBC construction.

BACKGROUND

Plastic containers have been increasingly used in packaging applications, such as food packaging. A typical plastic container often used for bulk packaging of food (e.g. powdery food, coffee, cocoa, nuts) is called FIBC(=flexible intermediate bulk container). This type of container often is a woven polyethylene or polypropylene.

In the inside or outside of the woven material, another plastic liner is often used. This liner is made of a monolayer or multilayer film which comprises polymer materials. There are different types of adherence of this liner to the outer woven liner as seen in the prior art documents e.g. U.S. Pat. No. 6,374,579.

In the case of a multilayer film, the different layers offer different advantages to the final applications. The inner layer (=the layer coming into direct contact with the food packed) is often formulated to allow very good sealing, thus protecting the existence of leakers that would be detrimental for the packed product. Other layers may comprise abuse resistant polymers to increase the mechanical strength of the material.

In case of oxygen sensitive food materials, at least one layer of the multilayer construction comprises material which is impermeable to oxygen. As such materials e.g. polyamides, PVDC or EVOH can be used.

It is very often the case that the multilayer film is in gusseted tube configuration. The reason is that this configuration is more practical for bulk filling, transport and unloading versus a simple tube.

Gussets are produced in line with the process by the use of two pleating constructions (often wooden, plastic or metal) which the film follows during on line processing. As these multilayer tube materials are often produced with the hot blown film method which often involves rotation of the collapsing frame and of the gusset equipment, a common problem is that the creases are not present continuously but periodically following the rotation and this increases the scrap and lowers the efficiency of the operation. There are cases where the creases are so often that the tube cannot be made into a gusset efficiently.

Consequently, there is a need to improve the "gussetability" of the plastic structure i.e. to find materials pliable enough and with enough bubble stability to produce gussets with no creases in the commonly used thickness range of 50-200 microns without sacrificing the oxygen barrier properties of the plastic film.

Another common requirement of the film used e.g. as interior film for FIBC bulk container is the need for excellent "flex crack resistance". As explained in WO2007/121590, flex cracking may occur during shipping and handling of liners where flowable materials are packed. As further explained in the above reference, the Gelbo flex testing is used for the evaluation of flex crack. However, this reference does not refer to oxygen barrier polymers which in general have much worse flex crack properties than polyolefins.

There has been in the prior art efforts to improve the flex crack of films. For example, EP 0 151 462 teaches a proper film construction to improve flex cracking of barrier polymers such as EVOH.

However, there is still a need in the market to improve further the gussetability and the flex crack of films that are used as FIBC liners.

In general it is well known that the barrier polymers and especially EVOH is quite prone to flex crack failure as the flex crack resistance is deteriorated versus a film comprising polyolefins only.

In the FIBC liner market films with the structure Polyolefin(outer layer)/tie layer/Polyamide/EVOH/tie layer/Polyolefin/Polyolefin(inner layer)
are sometimes used.

It is the experience of the inventor that such films are quite difficult to produce stably due to poor gussetability and they also suffer from poor flex crack properties. However, by using an ethylene alpha olefin copolymer with a density of less than 0.915 g/cm$^3$ unexpectedly the flex crack resistance improves substantially even if EVOH is present in the structure while gussetability also improves. This is further possible using an even comparatively high thickness of EVOH, which is in particular difficult for flex crack.

GENERAL DESCRIPTION OF THE INVENTION

According to the invention a multilayer film is provided comprising
- a layer comprising ethylene vinyl alcohol
- a layer comprising an ethylene alpha olefin copolymer with a density of less than 0.915 g/cm$^3$, wherein
- the multilayer film shows a flex crack resistance, measured according to the method described in the application, of less than 3 pinholes.

Preferred embodiments of the invention are disclosed in claims 2-10.

Definitions

In this application the following definitions are used:

The term "gusset" is interpreted as well known in the art. That is a plastic tubular film having a partial 3-fold configuration.

The term "film" refers to a flat or tubular flexible structure of thermoplastic material. The term "FIBC liner" refers to a plastic film slit, sealed and cut to the proper dimensions and used inside a "flexible intermediate bulk container" (FIBC) for extra protection of the bulk cargo.

The term "heat shrinkable" refers to a film that shrinks at least 10% in at least one of the longitudinal and transverse directions when heated at 90° C. for 4 seconds. The shrinkability is measured according to ASTM 2732.

The phrase "longitudinal direction" or "machine direction" herein abbreviated "MD" refers to a direction along the length of the film.

The phrase "outer layer" refers to the film layer which comes in immediate contact with the outside environment (atmosphere). In the FIBC application, the outer layer is in contact with the outside woven construction of PP or PE.

The phrase "inner layer" refers to the film layer that comes in direct contact with the product packed. This is also called "sealing layer" as this layer must be hermetically sealed in order to protect the product from ingress of air.

The phrase "intermediate layer" refers to any layer of the film that is neither outer nor inner layer. A film may comprise more than one intermediate layers.

As used herein, the term "homopolymer" refers to a polymer resulting from polymerization of a single monomer.

As used herein, the term "copolymer" refers to a polymer resulting from polymerization of at least two different polymers.

As used herein, the term "polymer" includes both above types.

As used herein, the term "polyolefin" includes all the polymers produced by polymerization of olefins. Polyethylene, polypropylene, polybutylene and other products are included in this general category.

As used herein the term "polyethylene" identifies polymers consisting essentially of the ethylene repeating unit. The ones that have a density more than 0.940 are called high density polyethylene (HDPE), the ones that are have less than 0.940 are low density polyethylene (LDPE).

As used herein the phrase "ethylene alpha olefin copolymer" refers to polymers like linear low-density polyethylene (LLDPE), medium density polyethylene (MDPE), very low-density polyethylene (VLDPE), ultra-low-density polyethylene (ULDPE), metallocene catalyzed polymers and polyethylene plastomers and elastomers.

In these cases, the alpha olefin can be propene, butene, hexene, octene etc. as known in the art.

As used herein the term "homogeneous ethylene alpha olefin copolymers" refer to ethylene alpha olefin copolymers having a molecular weight distribution less than 2.7 as measured by GPC. Typical examples of these polymers are AFFINITY from DOW or Exact from Exxon.

As used herein the phrase "styrene polymers" refers to styrene homopolymer such as polystyrene and to styrene copolymers such as styrene-butadiene copolymers, styrene-butadiene-styrene copolymers, styrene-isoprene-styrene copolymers, styrene-ethylene-butadiene-styrene copolymers, ethylene-styrene copolymers and the like.

As used herein the phrase "ethylene methacrylate copolymers" refers to copolymers of ethylene and methacrylate monomer. The monomer content is less than 40%. Abbreviation used is EMA.

As used herein the phrase "ethylene vinyl acetate copolymer" refers to copolymers of ethylene and vinyl acetate. Abbreviation used is EVA.

As used herein the term "barrier polymers" or "oxygen barrier polymers" refer to polymers that have an oxygen permeability less than 150 $cm^3/m^2*atm*24$ h per 10 microns of polymer. The measurement is made as per ASTM F 1927 at 23° C., 75% RH.

As used herein, the term EVOH refers to saponified products of ethylene vinyl ester copolymers. The ethylene content is typically in the range of 25 to 50% per mol.

As used herein the term PVDC refers to a vinylidene chloride copolymer wherein a major amount of the copolymer comprises vinylidene chloride and a minor amount of the copolymer comprises one or more monomers such as vinyl chloride and/or alkyl acrylates and methacrylates.

As used herein, the term "polyamides" includes aliphatic homo- or co-polyamides commonly referred to as e.g. polyamide 6, polyamide 69, polyamide 610, polyamide 612, polyamide 11, polyamide 12, polyamide 6/12, polyamide 6/66, polyamide 66/610, modifications thereof and blends thereof. Said term also includes crystalline or partially crystalline, aromatic or partially aromatic, polyamides, such as polyamide 6I/6T or polyamide MXD6. Said term also includes polyamides made of combination of three or more monomers, such as polyamide 6/66/12, 6/66/6I, 6/66/11 and others. The term also includes polyamide alloys such as Orgalloy from Arkema.

As used herein the term "ionomer" refers to ethylene-acid copolymers which have been neutralized by metals such as sodium, zinc, lithium or others.

The acid used is usually methacrylic or acrylic acid.

As used herein, the term "ethylene acid copolymer" refers to copolymers of ethylene with acid, most usually methacrylic or acrylic acid.

As used herein, the term "polyester" includes crystalline polymers, amorphous polymers and polyester elastomers. Common polyesters are crystalline PET (polyethylene terephthalate), amorphous PET, PETG (glycol modified polyethylene terephthalate), PBT (polybutylene terephthalate), PTT (polytrimethylene terephthalate), PBN (polybutylene naphthalate), PEN (polyethylene naphthalate), polyester-ether block copolymers and polyester-ester block copolymers of hard and soft blocks.

Other polyester materials are also included in the above definition.

As used herein the term "polybutylene" refers to butene-1 homopolymers and copolymers. Useful copolymers comprise ethylene mer units. Ethylene content should be generally less than 50%.

Percentages described herein refer to percentage by weight unless otherwise indicated.

DETAILED DESCRIPTION OF THE INVENTION

Film Construction

Preferably the film comprises 3 to 15 layers, more preferably 5 to 15 layers, even more preferably 7 to 12 layers.

A typical example of the film construction in 7-layer mode is

Outer layer/tie layer 1/tie layer 2/barrier layer/tie layer 3/intermediate layer/inner layer or Outer layer/tie layer 1/barrier layer/tie layer 2/intermediate layer 1/intermediate layer 2/inner layer A typical example of the film construction in 9-layer mode is Outer layer/tie layer 1/intermediate layer 1/tie layer 2/barrier layer/tie layer 3/intermediate layer 2/intermediate layer 3/inner layer In all film constructions disclosed herein, each tie layer, e.g. tie layer 1, tie layer 2, or tie layer 3 can have the same composition or a different composition.

In all film constructions disclosed herein, each intermediate layer, e.g. intermediate layer 1, intermediate layer 2, or intermediate layer 3 can have the same composition or a different composition.

The film is preferably produced by the hot blown film method and is preferably not heat shrinkable.

The film has less than 3 pinholes after exposure to flex crack testing as described below in "Flex-crack Resistance", preferable less than 2 pinholes, preferably less than 1.5 pinholes.

Preferably, the film comprises at least in one layer an ethylene alpha olefin copolymer of density less than 0.915 $g/cm^3$, more preferably the film comprises at least in two layers an ethylene alpha olefin copolymer of density less than 0.915 $g/cm^3$.

Barrier Layer(s)

The film in a preferred embodiment contains high oxygen barrier materials so that it protects the components of the pack from the detrimental effect of oxygen ingress. EVOH is a preferred option but also polyamide and PVDC can be also present, preferably polyamide. The EVOH has preferably an ethylene content of 24 to 50% ethylene per mol, more preferably 27 to 48%.

In a preferred version of the invention, the barrier polymer is polyamide. Most suitable polyamides are polyamide 6 and copolymer 6/66 or 6/12.

The thickness of the barrier layer is preferably at least 4 microns, more preferably at least 6 microns, even more preferably at least 8 microns.

Intermediate Layer(s)

Preferably, the intermediate layers comprise different polyolefins. Preferred polyolefins are ethylene alpha olefin copolymers, where alpha olefin is preferably butene, hexene or octene.

In a preferred version the ethylene alpha olefin copolymers are random copolymers with densities from 0.870 g/cm$^3$ up to 0.915 g/cm$^3$. In a further preferred version, the density of the ethylene alpha olefin copolymer is 0.880 to 0.905 g/cm$^3$.

In a further preferred embodiment the molecular weight distribution (Mw/Mn) of the ethylene alpha olefin copolymers are less than 10, preferably less than 5, preferably less than 3.

In a preferred version, an intermediate layer of the film comprises at least 30% by weight of an ethylene alpha olefin copolymer having a density from 0.870 to 0.915 g/cm$^3$. In a further preferred version, the layer comprises at least 50%, more preferable at least 70% of an ethylene alpha olefin copolymer having a density from 0.870 to 0.915 g/cm$^3$.

In a preferred version the density of the ethylene alpha olefin copolymer is 0.880 to 0.905 g/cm$^3$.

In a further preferred version, the polymer is an ethylene octane or ethylene hexane copolymer.

Tie Layer(s)

As well known in the art, there is no natural adhesion between polyolefins and oxygen barrier polymers such as EVOH.

Suitable materials for the tie layer process include maleic anhydride modified EVA, maleic anhydride modified polyethylene, maleic anhydride modified EMA, maleic anhydride modified elastomer, partially saponified EVA copolymer and polyurethane elastomer.

In the tie layers also polyamides can be used, given the strong natural adhesion between polyamide and EVOH. Preferred polyamides are polyamide 6, polyamide 6/66 and polyamide 6/12.

Outer Layer

The outer layer of the film may comprise polyolefins, polyamide and/or polyesters.

Preferably the outer layer comprises polyolefins, even more preferably ethylene alpha olefin copolymers.

The outer layer preferably comprises slip and/or antiblock additives such as amides, silica and others well known in the art. In a preferred version of the invention, the outer layer comprises at least 100 ppm (parts per million) per mass of an amide lubricant such as oleamide, erucamide, stearamide, oleyl palmitamide and so on.

Inner Layer

The inner layer of the film would be able to seal the film to itself to secure that no leakers and oxygen influx is allowed. This could be detrimental to the product packed.

Suitable materials for the inner layer include different polyolefins, preferably ethylene alpha olefin copolymers, low density polyethylene, polypropylene or polyether copolymers.

In general, the above layers may comprise further well known in the art additives such as antiblock, slip, antifog, polymer processing enhancers and others.

EXAMPLES

Example 1

From a commercial hot blown film line the following film was produced
Outer layer, thickness 15 microns
Intermediate layer 1, thickness 8 microns
Tie layer 1, thickness 8 microns
EVOH 38%, thickness 8 microns
Tie layer 3, thickness 8 microns
Intermediate layer 2, thickness 30 microns
Inner layer, thickness 23 microns.
Outer layer was a blend of
80% ethylene alpha olefin copolymer of density 0.918+ 18% low density polyethylene of density 0.923 and MFI 0.7+2% lubrication slip additive
Tie layer 1 was a blend of
70% ethylene hexene copolymer+30% maleic anhydride modified LLDPE The density of ethylene hexene copolymer was 0.919 while MFI was 1 under 190° C./2.16 kilos.

The maleic anhydride modified LLDPE was Bynel 41E710 from Dow.

Both Intermediate layer 1 and 2 comprised a blend of 70% octene based LLDPE 28% LDPE+2% polyethylene based slip and antiblock masterbatch. The octene based LLDPE had a density of 0.910 g/cm3 and an MFI of 1 measured at 190 C, 2.16 kg. The LDPE had a density of 0.923 g/cm3 and an MFI of 0.7 measured at 190 C, 2.16 kg.

Inner layer was a blend of
89% metallocene LLDPE+10% LDPE+1% slip antiblock masterbatch Metallocene LLDPE had a density of 0.918 while MFI was 1 under 190° C./2.16 kg. LDPE was the same as the LDPE used in the intermediate layer as above.

Example 2

In this example the tie layer 1 was replaced by polyamide BASF C40L (6/66 copolyamide) and intermediate layer 1 was replaced by tie layer 1.

Example 3

In this example, the example 1 was replicated but EVOH 38% was replaced by 32% which is stiffer and thought to be more difficult to form gusset.

Comparative Example

The comparative example was produced according to the structure already used in the market of
Polyolefin(outer layer)/tie layer/Polyamide/EVOH/tie layer/Polyolefin/Polyolefin(inner layer)
To do this the film produced was like
Outer layer, thickness 15 microns
Intermediate layer, thickness 8 microns
Tie layer 2, thickness 8 microns
EVOH 38%, thickness 8 microns Tie layer 2, thickness 8 microns
Intermediate layer, thickness 30 microns
Inner layer, thickness 23 microns.
Outer layer was a blend of
80% ethylene alpha olefin copolymer of density 0.918+ 18% low density polyethylene of density 0.923 and MFI 0.7+2% lubrication slip additive
66% of octene based LLDPE+30% LDPE+4% polyethylene based slip/antiblock masterbatch.
The octene based LLDPE had a density of 0.918 g/cm3 and an MFI of 1 measured at 1900, 2.16 kg. The LDPE had a density of 0.924 g/cm3 and an MFI of 0.7
Tie layer 2 was a blend of
70% ethylene hexene copolymer+30% maleic anhydride modified LLDPE The density of ethylene hexene copolymer was 0.919 while MFI was 1 under 190° C./2.16 kilos
In general, the Tie layer 1 is the same as in example 1.
Intermediate layer comprised a blend of 70% octene based LLDPE+28% LDPE+2% polyethylene based slip and antiblock masterbatch. The octene based LLDPE had a density of 0.918 g/cm3 and an MFI of 1 measured at 1900, 2.16 kg. The LDPE had a density of 0.924 g/cm3 and an MFI of 0.7
measured at 190 C, 2.16 kg. The structure of this layer is same as in example 1.
Inner layer was a blend of
89% metallocene LLDPE+10% LDPE+1% slip antiblock masterbatch
Metallocene LLDPE had a density of 0.918 while MFI was 1 under 190° C./2.16 kg. LDPE was the same as the LDPE used in the intermediate layer as above. The structure of this layer is same as in example 1.
Method of Gussetability Evaluation
On the tower of the blown film line two gusset boards were mounted as known in the art. Each example structure ran in production for 2 hours and the number of creases was monitored. As the creases tend to come along in timely intervals, "creasing instances" were recorded, meaning any incident was recorded when more than 3 creases passed from the nip section of the blown film line.
The rotation speed was kept constant during the experiment.
Results of Gussetability Testing
Example 1 presented 1 creasing incident during the two hours production.
Example 2 presented 1 creasing incidents.
Example 3 presented 2 incidents.
The Comparative Example presented 8 incidents during the two hours production.
Measurement of Flex Crack Resistance
Flex crack resistance was measured using a Gelbo Flex Tester. The instrument construction and functionality were per ASTM F392-93 except for the frequency (cycles per minute) and the time of the testing which are as of below.
The testing was done by repeatedly twisting and crushing the film as per ASTM F392-93 (full flex). The area tested (and on which the pinholes were identified) was always 560 cm$^2$, therefore the number of pinholes corresponds to this area.
The flexing action consists of a twisting motion at a speed of 47 cycles per minute. The sample is flexed for 7 minutes and then flex failure is determined by measuring the number of pinholes formed in the film. The results are averages of testing of 10 specimens of each film.
Pinholes were determined by using colored turpentine and allowing it to stain through the holes onto a white backing.

The higher the number of pinholes the less flex crack resistant the film is.
Test Results:

| FILM REFERENCE | NUMBER OF PINHOLES |
|---|---|
| EXAMPLE 1 | 1.1 |
| EXAMPLE 2 | 1.2 |
| EXAMPLE 3 | 1.2 |
| COMPARATIVE EXAMPLE | 6 |

Therefore, the film, even comprising EVOH with a high thickness, has unexpectedly very good flex crack resistance and gussetability.

The invention claimed is:
1. A gusseted tubular multilayer film product, comprising:
   a layer selected from the group consisting of ethylene vinyl alcohol alone or combined with polyamide and/or PVDC; and
   a layer comprising an ethylene alpha olefin copolymer with a density of less than 0.915 g/cm$^3$ and a molecular weight distribution (Mw/Mn) of less than 10;
   wherein the multilayer film product is not heat shrinkable and a) comprises a gusseted tube having at least one gusset formed inline using a blown film line and b) has a flex crack resistance of less than 3 pinholes.
2. The gusseted tubular multilayer film product of claim 1, where the ethylene vinyl alcohol comprises a molar ethylene content of about 27 to about 48%.
3. The gusseted tubular multilayer film product of claim 1, wherein the layer comprising ethylene vinyl alcohol has a thickness of at least 4 microns.
4. The gusseted tubular multilayer film product of claim 1, wherein the multilayer film has a total thickness of about 50 to about 200 microns.
5. The gusseted tubular multilayer film product of claim 1, wherein the flex crack resistance is less than 2 pinholes.
6. The gusseted tubular multilayer film product of claim 1, wherein the multilayer film comprises an inner layer, an outer layer and a barrier layer.
7. The gusseted tubular multilayer film product of claim 6, further comprising an intermediate layer located between the inner layer and outer layer.
8. The gusseted tubular multilayer film product of claim 7, wherein the intermediate layer comprises an ethylene alpha olefin copolymer.
9. The gusseted tubular multilayer film product of claim 6, wherein the barrier layer includes the layer comprising ethylene vinyl alcohol.
10. The gusseted tubular multilayer film product of claim 1, wherein the product is a flexible intermediate bulk container liner.
11. The gusseted tubular multilayer film product of claim 10, wherein the multilayer film comprises an inner layer, an outer layer and an intermediate layer, and the intermediate layer comprises the ethylene vinyl alcohol.
12. The gusseted tubular multilayer film product of claim 10, wherein the ethylene vinyl alcohol has a molar ethylene content of about 27% to about 48%.
13. The gusseted tubular multilayer film product of claim 10, wherein the multilayer film further comprises an intermediate layer including an ethylene alpha olefin copolymer.
14. The gusseted tubular multilayer film product of claim 10, wherein the multilayer film has a total thickness of about 50 to about 200 microns.

15. The gusseted tubular multilayer film product of claim 14, wherein the layer comprising ethylene vinyl alcohol has a thickness of at least about 4 microns.

16. The gusseted tubular multilayer film product of claim 10, wherein the multilayer film has a flex crack resistance of less than 2 pinholes.

17. The gusseted tubular multilayer film product of claim 1, wherein the multilayer film product has seven film layers arranged in the following order: outer layer/intermediate layer-1/tie layer/middle layer/tie layer/intermediate layer-2/inner layer;

the outer layer comprises a blend of ethylene-alpha olefin copolymer and low density polyethylene;

at least one of intermediate layer-1 and intermediate layer-2 comprises the ethylene alpha olefin copolymer with a density of less than 0.915 g/cm$^3$ and a molecular weight distribution (Mw/Mn) of less than 10;

the middle layer consists of the ethylene-vinyl alcohol; and the inner layer comprises metallocene-catalyzed linear low-density polyethylene.

18. The gusseted tubular multilayer film product of claim 17, wherein intermediate layer-1 and intermediate layer-2 each comprise the ethylene alpha olefin copolymer with a density of less than 0.915 g/cm$^3$ and a molecular weight distribution (Mw/Mn) of less than 10.

19. A gusseted tubular multilayer film product, comprising:

a layer selected from the group consisting of ethylene vinyl alcohol alone or combined with polyamide and/or PVDC; and a layer comprising an ethylene alpha olefin copolymer with a density of 0.880 to 0.905 g/cm$^3$ and a molecular weight distribution (Mw/Mn) of less than 5;

wherein the multilayer film product is not heat shrinkable and a) comprises a gusseted tube having at least one gusset formed inline using a blown film line and b) has a flex crack resistance of less than 3 pinholes.

20. The gusseted tubular multilayer film product of claim 19, wherein the multilayer film product has seven film layers arranged in the following order: outer layer/intermediate layer-1/tie layer/middle layer/tie layer/intermediate layer-2/inner layer;

the outer layer comprises a blend of ethylene-alpha olefin copolymer and low density polyethylene;

at least one of intermediate layer-1 and intermediate layer-2 comprises the ethylene alpha olefin copolymer with a density of 0.880 to 0.905 g/cm$^3$ and the molecular weight distribution (Mw/Mn) of less than 5;

the middle layer consists of the ethylene-vinyl alcohol; and the inner layer comprises metallocene-catalyzed linear low-density polyethylene.

21. The gusseted tubular multilayer film product of claim 20, wherein intermediate layer-1 and intermediate layer-2 each comprise the ethylene alpha olefin copolymer with a density of 0.880 to 0.905 g/cm$^3$ and the molecular weight distribution (Mw/Mn) of less than 5.

* * * * *